May 11, 1948.  O. E. FISHBURN  2,441,140
POWER TRANSMISSION MECHANISM
Filed March 23, 1944  2 Sheets-Sheet 1
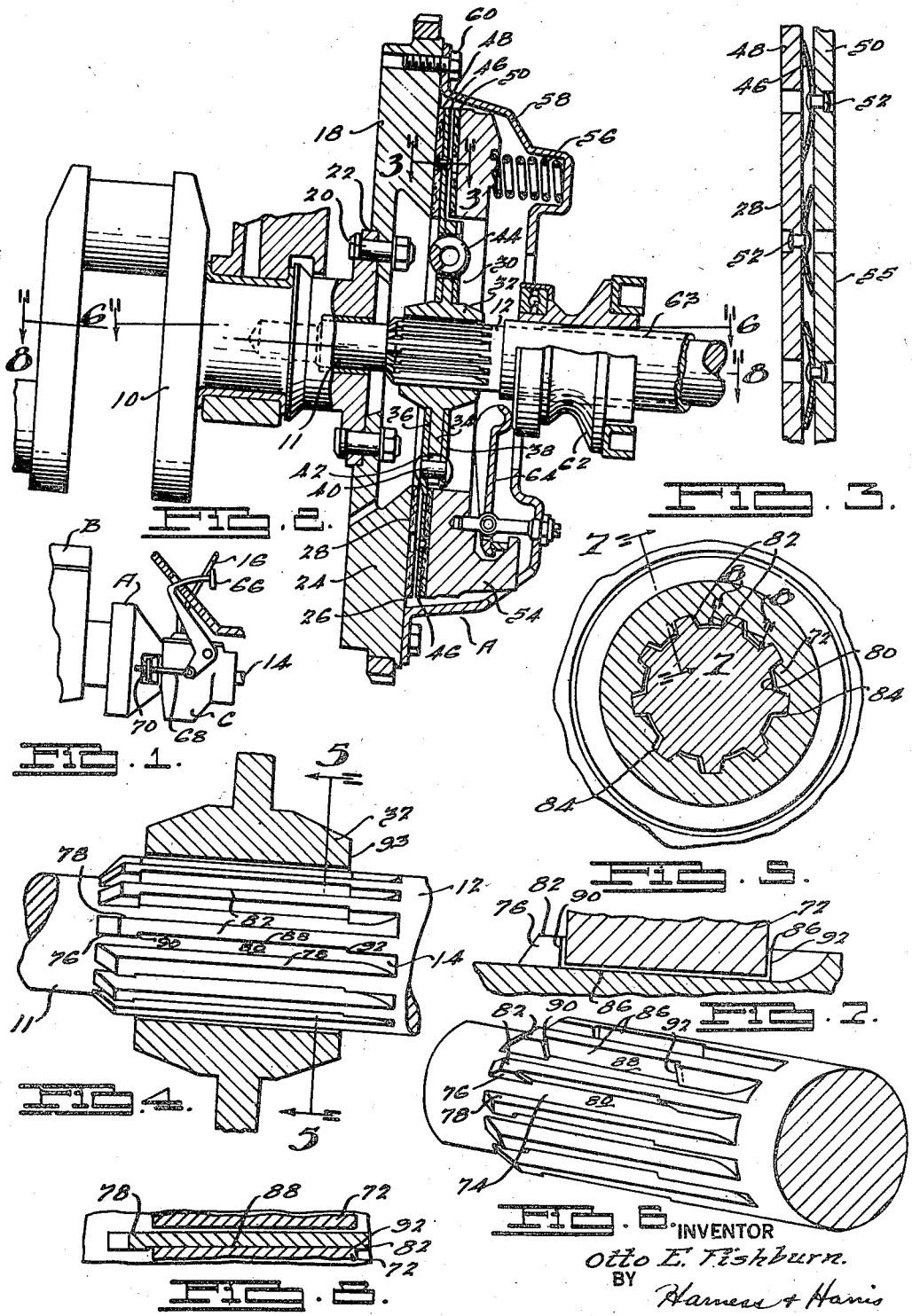
INVENTOR
Otto E. Fishburn.
BY
Harness & Harris
ATTORNEYS

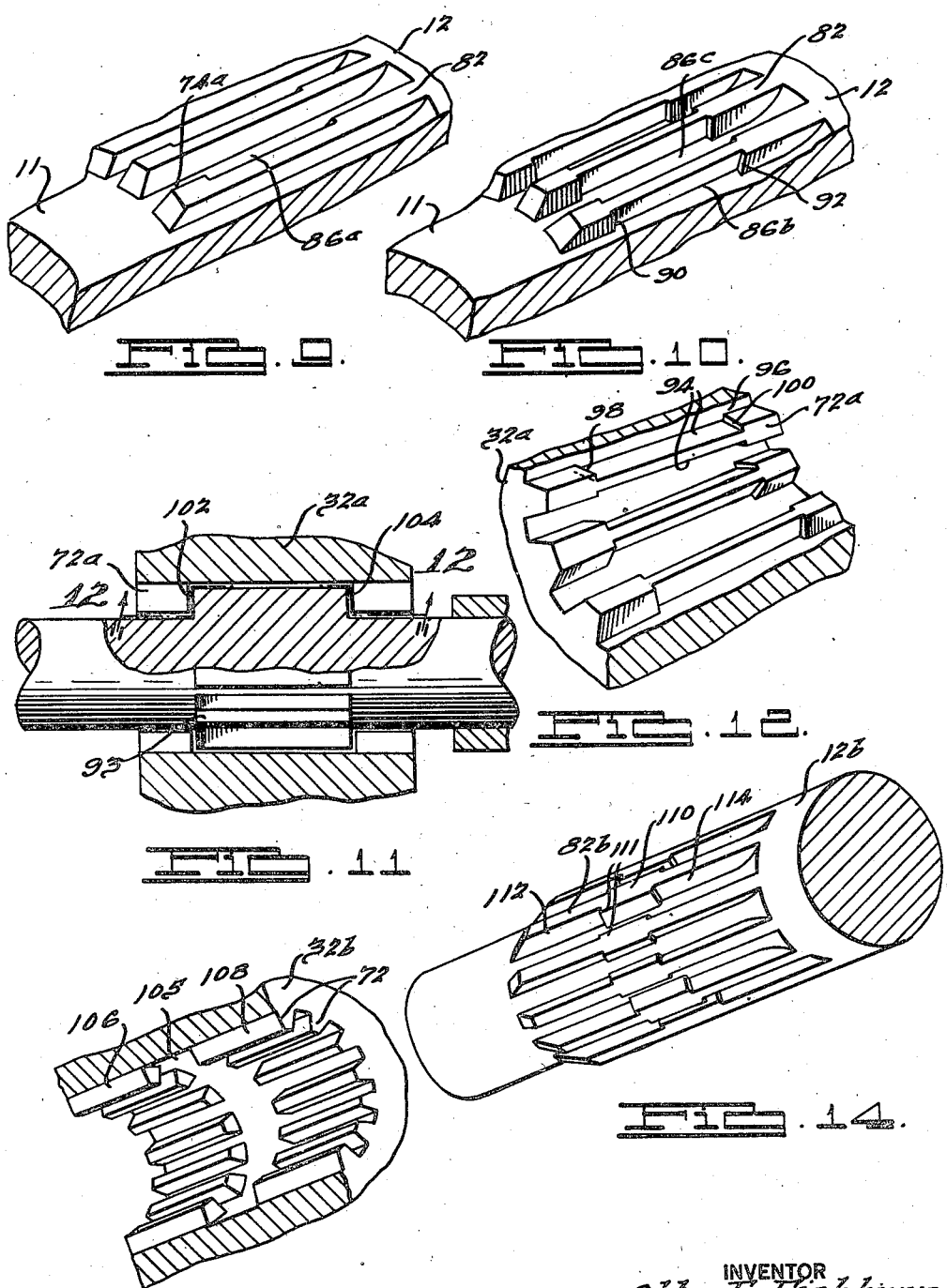

Patented May 11, 1948

2,441,140

UNITED STATES PATENT OFFICE 2,441,140

POWER TRANSMISSION MECHANISM

Otto E. Fishburn, Detroit, Mich., assignor to Chrysler Corporation, Highland Park, Mich., a corporation of Delaware Application March 23, 1944, Serial No. 527,716

16 Claims. (Cl. 192—68)

This invention relates to power transmission mechanism and is concerned in particular with structures for inhibiting relative axial creep and drift between engageable drive transmitting elements of power transmission clutches.

The problem has been encountered, for example, in disc clutches of the type interposed between the engine and transmission of motor driven vehicles. Clutches of this character may comprise a backing plate driven by the engine, a spring actuated pressure plate carried by the backing plate and axially movable toward the former, and a clutch disc assembly splined to the transmission input shaft and interposed between the backing and pressure plates.

Heretofore, during normal disengagement of the clutch, as when shifting gears in the transmission from neutral or other transmission condition to obtain either a speed ratio or directional change in the rotation of the vehicle tail shaft, the clutch disc assembly has tended to drift or creep toward the pressure plate and cause the clutch disc to drag on the latter thereby tending to drive the transmision input shaft. The drift action has been substantially influenced by the conventional rearward declination of the clutch axis and by normal tendency of the rotating clutch disc to back away when the pressure thereon is released. When the transmission axis is forwardly declined the drift of the clutch disc is toward the backing plate with similar results. Needless wear of the clutch disc and interference with synchronizing of the transmission gears in establishing a desired speed or directional change usually results from the aforesaid condition.

I have discovered that the difficulty may be materially alleviated, if not entirely overcome by providing means for limiting axial movement of the clutch disc so as to centralize it relative to the backing and pressure plates yet without requiring additional parts or making assembly a complexity. Thus, for example, the novel result may be obtained by relieving or entirely removing portions of the teeth or keys of one member of the splined connection between the shiftable member and its support, for instance between the clutch disc and shaft, to provide recesses for receiving portions of the teeth or keys of the other member under conditions of operation when creep or drift tendencies are likely to be present. The recesses are arranged to limit axial movement of the shiftable member and thus prevent such a change in the relationship of the engageable clutch elements as will produce drag or other undesirable conditions.

My invention is well adapted for use with disc clutches and hence, for purposes of disclosure I shall describe an illustrated embodiment as so employed, it being understood, however, that this is but one of various possible applications of the novel features of my invention since as will become self-evident hereinafter, the invention may also be utilized for preventing creep between relatively slidable engaged gear parts and tooth clutches to thus avoid their jumping out of mesh.

It is, therefore, the general object of my invention to provide mechanism for controlling axial creep or drift between engageable torque transmitting elements whereby to maintain a predetermined relationship between such elements.

Another object is to provide in a power transmitting clutch, mechanism to control creep or drift of one of the clutch members.

A further object is to provide mechanism for preventing drag between members of the main clutch of a motor driven vehicle when conditioning the transmission for a speed or directional change in the tailshaft thereof incident to disengaging the clutch.

A specific object is to provide in a disc clutch, mechanism to control creep or drift of the clutch disc or mat to prevent drag thereof upon the clutch pressure plate.

Another specific object is to provide a disc clutch with mechanism for substantially centralizing the clutch disc between the backing plate and pressure plate when the clutch is disengaged for gear shifting to prevent its dragging upon these plates.

Still another object is to provide an improved clutch mechanism for facilitating speed changes in a gear transmission by enabling the gear elements to be more readily synchronized for shifting.

Other objects and advantages of my invention will become more apparent from the following description taken in connection with the accompanying drawings wherein:

Fig. 1 is a fragmentary, side elevation of a power plant and change speed mechanism in which my invention is embodied;

Fig. 2 is an enlarged longitudinal sectional view illustrating a disc clutch mechanism embodying my invention;

Fig. 3 is a fragmentary circumferential development in section showing the construction of the clutch disc;

Fig. 4 is an enlarged view partially in section of the splined connection between the clutch disc hub and transmission shaft of Fig. 2 showing an embodiment of the invention adapted for limiting creep or drift;

Fig. 5 is a sectional view taken at line 5—5 of Fig. 4 showing the hub and shaft teeth in their relative positions when the clutch is disengaged and the shaft is in "coast";

Fig. 6 is a perspective view of a portion of the shaft of Fig. 4 showing the construction of the keys or teeth and their splineways;

Fig. 7 is a fragmentary longitudinal cross-sectional view taken at 7—7 of Fig. 5;

Fig. 8 is a fragmentary longitudinal cross-sectional view taken at 8—8 of Fig. 5 with the clutch disc hub in its rearward limit position;

Fig. 9 is a perspective view of the shaft of Figures 2 and 4 showing the keys or teeth relieved on the opposite face from that of the teeth of Fig. 6;

Fig. 10 is a perspective view of the shaft of Figs. 2 and 4 showing a construction for meeting all creep or drift conditions;

Fig. 11 is an enlarged view showing a reverse construction of the splined connection between the clutch disc hub and shaft of Figs. 2 and 4;

Fig. 12 is a fragmentary perspective view of the hub member of Fig. 11; and

Figs. 13 and 14 illustrate the form of hub and shaft construction, respectively, of a modified splined connection embodying my invention.

Referring to the drawings my invention is illustrated embodied in a clutch mechanism A commonly used between a prime mover such as an internal combustion engine B and a change speed mechanism or transmission C. The engine B, which may be of the well-known types used in motor vehicles, includes a driving crankshaft 10 (which for the purposes of this description will be assumed to have a clockwise direction of rotation looking from front to rear of the vehicle when driving) having piloted in the rear end portion thereof as at 11, a shaft 12 adapted to be driven thereby and extending rearwardly into the transmission C. A tailshaft 14 of the transmission, transmits drive to the vehicle driving wheels (not shown) in the well-known manner.

The transmission C may, for example, be of the conventional variable three speed type wherein shifts are made incident to clutch disengagement and a plurality of gears are adapted to be selectively engaged through operation of a shifter lever 16 for varying the speed and/or direction of rotation of the tailshaft 14, some of such gears being carried by the shaft 12, in the well-known manner and adapted to engage other gears of the transmission to produce a selected speed ratio or direction of rotation of the shaft 14. The control and operation of the transmission C being well-known, details thereof are accordingly omitted for the sake of brevity. However, reference is made to my prior Patent No. 2,242,026 granted May 13, 1941, for a typical transmission with which my invention may be used.

The drive from the driving shaft 10 to the driven shaft 12 of the transmission C is controlled by the clutch A which may as illustrated, be of the friction disc type. The clutch C includes a flywheel member 18, secured by bolts 20, to a flange 22 of the shaft 10, and constituting the driving member of the clutch mechanism. The flywheel 18 has an annular radially outwardly disposed enlarged plate-like backing portion 24, the face 26 whereof is frictionally engageable with the adjacent face 28 (Fig. 3) of the clutch disc assembly generally referred to by the numeral 30. The clutch disc assembly comprises a hub 32 splined to the shaft 12 for axial movement in the manner hereinafter more particularly discussed and to provide a drive connection between the clutch disc assembly and shaft 12.

The hub 32 has a central flange 34 to which a clutch disc spider 36 is frictionally held for relative motion by an annular plate 38, suitable connection means including a rivet 40, being provided. The flange 34 is slotted as at 42 to permit limited relative rotation between the hub and spider and compression springs 44 connect the spider and hub to transmit the drive in the well-known manner.

The spider 36 has a plurality of dished outwardly projecting flexible fingers 46 (Figs. 2 and 3), which carry the friction discs or rings 48 and 50 respectively. It will be noted that the rings are held by rivets 52 to alternate fingers and that the fingers carrying the ring 48 are dished oppositely to the fingers carrying the ring 50. The friction rings are thus resiliently separated when the clutch is disengaged and may be smoothly brought together upon flattening the dished portions during clutch engagement. The relative movement of the friction rings 48 and 50 afforded by the fingers 46 is generally in the order of about .035".

The clutch disc assembly 30 is urged into frictional engagement with the backing plate 24, by a pressure plate 54 which is engageable with the immediately adjacent face 55 of the friction ring 50. The pressure plate 54 is resiliently urged against the clutch disc assembly by a plurality of compression springs, one of which is indicated at 56, positioned between the adjacent faces of the pressure plate 54 and a cover member 58 secured to the flywheel 18 by bolts, one of which is shown at 60.

The clutch mechanism A is located in position for establishing a drive from the driving shaft 10 to the driven shaft 12 of the transmission, the drive being through the clutch disc assembly 30 to the shaft 12 and through the splined connection between the hub 32 and shaft 12.

The drive from the engine B to the transmission may be released by axial movement of a collar 62 carried on a stationary sleeve 63 and engageable with a plurality of circumferentially spaced pivotally mounted fingers, one of which is shown at 64, for moving the pressure plate 54 to the right in Fig. 2, against the action of the springs 56, thereby releasing the clutch disc assembly from frictional engagement with the backing plate 24 of the flywheel 18 and disconnecting the drive between the shafts 10 and 12. As is well known, the pressure plate 54 is retracted against the action of the springs 56 by operation of a foot pedal 66 (Fig. 1) acting through a linkage 68 to move the collar 62 to the left in Fig. 2. As the plate 54 is retracted, the friction rings 48 and 50 will separate and the clutch disc assembly 30, will move axially on the shaft 12, away from the backing plate 24, this movement being induced somewhat by forces then acting upon the clutch disc assembly and by the rearward declination of the transmission shaft as indicated by the lines 6—6 and 8—8 in Fig. 2, the former being on the horizontal. The plate 54 will continue its movement to the right until the clutch pedal 66 has been depressed to the limit of its downstroke. The total movement of the plate 54, from engaged to fully released position of the clutch, usually about .095", will hereinafter be referred to as "clutch departure."

Adjustments in the pressure plate movement may be made in the clutch linkage as at 70, Fig. 1.

In operation of the change speed mechanism C, it is desirable that the transmission of driving torque from the engine A to the shaft 12, be terminated when the clutch mechanism is actuated to released position, in order to smoothly and efficiently establish a speed ratio or directional change in the transmission C. In this connection it is well known that such changes are effected by selectively drivingly connecting gears or other tooth members for instance, a tooth member carried by the shaft 12 and another that drives the shaft 14 and that substantial synchronism is essential to establish the drive. If the clutch disc assembly is subjected to driving torque from the engine, difficulty is usually experienced in disengaging the drive to be released and in connecting the members to establish the new ratio. Moreover, gear clashing and undue wear of parts may result. Heretofore when the clutch was released the clutch distended to drift or creep axially toward the pressure plate. The weight of the clutch disc assembly caused the latter to exert a thrust against the pressure plate with the result that a driving torque was transmitted to the clutch disc assembly from the engine when it was not desired. This condition was emphasized by the rearward declination of the shaft 12 and when shifting gears on a hill. Under certain circumstances such as a change in the shaft axis to a forward destination a similar situation occurred by drift of the clutch disc forwardly to drag against the backing plate of the flywheel.

A feature of the invention is to overcome the foregoing difficulty by providing means for centralizing the clutch disc assembly between the backing plate and pressure plate during the shifting operation.

Referring now more particularly to Figs. 2, and 4 to 9 inclusive, it will be recalled that the clutch disc hub 32 is splined to the shaft 12 in a manner to permit axial movement of the hub relative to the shaft and for transmitting torque thereto from the engine when the clutch is engaged. To this end the hub 32 is provided with a radial tooth or spline 72 preferably of truncated V form extending longitudinally of the hub axis and substantially parallel thereto and which is received in a splineway 74 of complementary shape to the tooth 72 and formed by side walls 76 and 78 respectively, and a bottom wall 80 in the shaft 12 as best seen in Fig. 6. The splineway 74 may, if desired, be formed by a pair of spaced teeth 82. Preferably, however, in order to distribute the driving load between the hub and shaft and avoid excessive tooth size, the shaft 12 will be provided with a series of uniformly circumferentially spaced radial teeth 82 formed by cutting a series of splineways 74 in the surface of this member in any suitable manner and the hub 32 will likewise have a series of uniformly spaced internal radial teeth 72 to be received in the splineways respectively, of the shaft.

The normal width of the teeth 72 will preferably be the same as that of the splineways 74 with operating clearance, (back lash) to permit the hub and shaft to slide relative to each other. The bottoms 84 of the hub splineways preferably will provide a bearing surface for the teeth 82 and clearance will be provided between the teeth 72 and bottoms 80 of the shaft splineways. It will be understood, however, that this relationship may be in the reverse order.

As clearly shown in Figs. 4 to 8 inclusive, the coast sides 76 of the shaft teeth 82, that is the leading sides of these teeth when torque is being transmitted from the engine B to the transmission C through the hub teeth 72, are relieved the full depth thereof and for a length greater than the length of the hub teeth 72 to provide recesses 86 each having a longitudinal bottom wall 88 paralleling the faces 76 of the shaft teeth, and transverse end walls 90 and 92 respectively, substantially normal to the wall 88. Preferably these recesses will be formed by a burnishing operation on the shaft teeth 82 in order to thereby provide sharp corners between the end walls and bottoms of the recess and between the end walls and faces of the shaft teeth for reasons which will be presently understood. As previously stated, the length of the recesses 86 is greater than the length of the hub teeth 72 such that when these portions are aligned the hub teeth may be received in the recesses 86. Preferably the length of the recesses 86 will exceed the length of the hub teeth by an amount that is less than the extent of clutch departure. The depth of the recesses 86 in the faces of the shaft teeth have been exaggerated in the drawings for purposes of illustration. In actual practice recesses between three to eight thousandths of an inch deep will give effective results in operation, a depth of five thousandths of an inch being preferred.

The function of the recesses 86 will now be explained. When it is desired to shift gears in the transmission C, for example, from a lower to a higher speed ratio, the throttle will be released to permit the engine B to slow down to idle, this action also causing the clutch disc assembly 30 to slow down. Depression of the clutch pedal 66 will now operate the linkage 68, collar 62 on the shaft 12, and levers 64, to move the pressure plate 54 of the clutch mechanism to the right in Fig. 2 to disengage this member from the clutch disc assembly 30. During this movement the friction rings 48 and 50 will become separated by the fingers 46 due to the release of pressure thereon by the pressure plate until finally the pressure plate will move completely away from the friction ring 50. This release of pressure on the rearward side of the clutch disc assembly will tend to actuate the latter in the same direction as the pressure plate has been moved. Such movement will be facilitated by any rearward declination of the shaft 12 axis.

Release of the clutch will also allow the transmission shaft 12 to coast under drive of the vehicle driving wheels and it will pick up the clutch disc assembly which has been slowed down below the shaft coast speed, by the engine. In this transformation the hub 32 will have moved toward the pressure plate as aforesaid sufficiently to align the hub teeth 72 with the recesses 86 of the shaft so that as the shaft 12 picks up the hub the recesses will encompass the teeth 72 and the clutch disc assembly will be driven by the shaft 12 through contact between the walls 88 of the shaft teeth recesses and the immediately adjacent faces of the hub teeth 72. It will be understood that as the shaft 12 coasts down, for instance under action of cone synchronizers to effect a shift in the transmission the hub 32 due to the lost motion rotatively between it and the shaft 12 may occasionally lead the shaft so as to cause the hub teeth 72 to leave the recesses 86 and contact the opposite walls 78 of the shaft splineways. However, the impact between these faces and the hub teeth will be sufficient to immediately cause the hub teeth to return to their original position in the recesses 86.

As thus driven the clutch disc assembly is disengaged from both backing plate and pressure plate and preferably midway between the latter plates. Since the recesses 86 have a length in excess of the hub teeth length less than the clutch departure, it will be evident that should the clutch disc assembly now drift or creep further rearwardly toward the pressure plate, the ends 93 (Fig. 8) of the hub teeth which are preferably sharp and spare with the sides thereof, will engage the transverse faces 92 of the recesses 86 before the friction disc 50 contacts the pressure plate to prevent any further movement of the hub and in this manner prevent the clutch disc assembly from dragging on the pressure plate 54 to thereby impede the shift then being made in the transmission C. In a similar manner the transverse faces 90 of the recesses 86 will serve to limit forward creep or drift of the assembly 30 and prevent drag thereof on the backing plate 24.

When the shift in the transmission C has been completed and the clutch pedal 66 is released, the pressure plate 54 will initially move into contact with the friction ring 50 of the clutch disc assembly 30 immediately causing a drag of the pressure plate on the clutch disc. The pressure plate will now drive the clutch disc assembly and will cause the teeth 72 of the clutch disc hub to leave the recesses 86 and effect a driving contact with the unrecessed faces 78, of the shaft teeth whereupon the clutch disc assembly may now be freely moved axially by the pressure plate into pressure contact with the backing plate 24 to complete the drive engagement.

While the operation of the structure shown in Fig. 2 has been described with respect to an upshift between speeds in the transmission C, it will be understood that the structure will function in a similar manner for other shifts. It will also be observed that the described features of the present invention are obtained without in any manner rendering difficult, disassembly of the shaft 12 from its bearing in the drive shaft 10 and/or from the clutch disc assembly such as would be encountered where, for example, stop rings and the like were employed for limiting the clutch disc assembly movement.

In Figure 9 I have shown a transmission shaft construction similar to that of the shaft 12 of Figures 2, 4, and 6 except that the recesses 86ª for limiting creep or drift are on the opposite side of the shaft splineways 74ª from the recesses 86 of Fig. 6. Such a construction will be necessary, for example, when the direction of drive of the shaft 12 from the engine is opposite to that of the construction in Fig. 2. Moreover, other conditions of operation may be encountered when this embodiment is preferred. It will be understood that the cooperating elements hub 32, etc., will be similar to those of Fig. 2.

As previously pointed out, the hub teeth 72 may occasionally momentarily leave the recesses 86 while the clutch is disengaged. Moreover, in employing my invention with certain transmissions it may be found that the teeth 72 will initially engage the drive side 78 of the shaft teeth. To meet all conditions, I have provided the shaft construction shown in Fig. 10 where the teeth 82 of the shaft 12 are provided with opposite recesses 86ᵇ and 86ᶜ in contrast to the single recess construction of Figs. 6 and 9. Thus when the clutch is now disengaged the hub teeth 72 will always be encompassed by a shaft tooth recess irrespective of the relative rotation between the members, and the clutch disc assembly will always be prevented from drifting or creeping into drag engagement with either the backing plate or pressure plate. In order to avoid a whip action between the hub and shaft, it is preferred that recesses 86ᵇ and 86ᶜ be approximately half the depth of the recesses 86 such that the amount of relative rotation possible between the shaft 12 of Fig. 10 and the hub teeth 72 will be substantially the same as that between the hub teeth 72 and the recesses 86. A total of eight thousandths of an inch is preferable.

The operation of the double recess construction when employed for the shaft 12 in the Fig. 2 arrangement is the same as that described with respect to the single recess except that when releasing the clutch after completing a gear shift the teeth 72 will be engaged in one or the other of the recesses of the shaft teeth. Consequently as the pressure plate urges the clutch disc assembly into contact with the backing plate, the transverse faces 90 of the recesses will tend to limit the forward movement of the hub. Usually, however, because of the very small depth of the recesses 86 and the powerful thrust effect of the springs 56, the hub teeth 72 will jump the stop shoulder and permit the clutch engagement to be completed in the normal manner. In any event there is sufficient flexibility in the clutch disc construction to enable the clutch engagement to be effected even though the hub should be stopped by the ends 90 of the recesses.

In Figs. 11 and 12 I have shown a modification of my invention which may be substituted for the construction in Figs. 4, 9, and 10. In this arrangement the tooth recesses are provided on the hub teeth instead of on the shaft teeth, the latter being plain. Thus the hub 32ª in Figs. 11 and 12 has its teeth 72ª formed with opposite recesses 94 and 96 respectively between the ends thereof providing the transverse stop faces 98 and 100 respectively, these stop faces functioning in a manner similar to that described for the transverse faces 90 and 92 of the construction in Figs. 2, 4, and 6. It will be understood that one of the recesses, for instance, the recess 94 on the drive side of the teeth 72ª may be omitted where a single recess construction is desired to perform the functions described with respect to the construction in Figs. 2 and 4. Moreover, it will be evident that the ends 102, 104 of the shaft teeth should provide sharp corners with the side face of the shaft teeth.

Referring now to Figs. 13 and 14 it will be observed that in this construction the hub 32ᵇ, which in all other respects is similar to the hub 32 in the Fig. 4 construction, has a central section 105 of its teeth 72 entirely removed in effect forming separate radial tooth portions 106 and 108. Moreover, the shaft 12ᵇ, which is otherwise similar to shaft 12 in the Fig. 2 construction, has its radial teeth 82ᵇ recessed on opposite sides of a central portion 110 thus creating the recesses 112 and 114 respectively. Both sides of the teeth 82ᵇ may be recessed as shown when the double recess construction is desired. The depth of the recesses 112 and 114 will be in the order of that described with respect to the recess 86 of Fig. 6 for the single recess construction and in the order of the recess 86ᵇ and 86ᶜ for the double recess construction. Moreover, the projections 111 will have a length axially of the hub less than the distance between the tooth portions 106 and 108 of Fig. 13, this difference being less than the clutch departure in order that the projections 111 may be received between the portions 106 and 108, or stated otherwise, such that the teeth 106, 108 be received in the recesses 112 and 114 respectively and the clutch disc assembly 30 be properly centralized between the clutch plates when the clutch is released in the manner described for the Fig. 2 construction. It will be understood that the splineway between the projections 111 of adjacent teeth on the shaft will be of a size to receive the tooth portions 106 or 108 with customary clearance so that the hub teeth may slide between adjacent projections 111. Moreover, it will be evident that the recesses 105 between the tooth portions 106 and 108 need not extend between the opposite side faces of the teeth 32ᵇ but may be of the character of the recess 86 of Fig. 4 except that the depth thereof should exceed that of the tooth projections 111, since the projections 111 of the shaft 12ᵇ teeth do not transmit any driving torque when engaged in the recess between the tooth portions 106 and 108 whereas in the Fig. 4 construction the tooth portions in the recess do transmit drive.

From the foregoing description of my invention, it will be seen that I have provided a simple and desirable construction for eliminating clutch drag by reason of drift or creep of the clutch disc upon clutch disengagement when making speed ratio or directional shifts in the transmission and that such is accomplished without addition of new parts or assembly difficulties. While the particular structures herein described are well adapted for carrying out the objects of the invention, it will be understood that various modifications, changes, and substitutions may be made without departing from the spirit thereof. For instance, it will be observed that to avoid the necessity of cutting recesses in the various described members where such recesses have been provided, the constructions may be created by assembling together several sections formed with plain teeth or no teeth as required. Moreover, in most constructions the drift tendency of the clutch disc during shifting will be rearward and in some instances it may therefore be desired to dispense with the forward stop shoulder. In addition, it will be evident to those skilled in the art that the invention is applicable to other applications where it is desired to maintain a predetermined relationship between engageable power transmitting members. The present invention is, therefore, to be construed to include all such modifications, changes and substitutions as may come within the scope of the following claims.

What I claim as new and desire to protect by Letters Patent is:

1. Power transmission mechanism comprising a first rotatable clutch member adapted to be engaged with a second rotatable clutch member to establish a drive therebetween and a third rotatable member in splined connection with said first member, the said first and third members being axially movable relative to each other, and said splined connection comprising a pair of spaced radial teeth on one member thereof, and a radial tooth on the other member thereof received between said spaced teeth and engageable therewith, one tooth having a shallow recess in a side face thereof between the ends of the tooth permitting limited relative rotation between said first and third members and another adjacent tooth having a portion adapted to be received in said recess upon engagement of said adjacent teeth incident to said relative rotation, whereby to limit relative axial movement of said first and third members, the length of said recess longitudinally of its tooth being greater than the length of the said adjacent tooth portion.

2. Power transmission mechanism comprising a first rotatable clutch member adapted to be engaged with a second rotatable clutch member to establish a drive therebetween, and a third rotatable member in splined connection with said first member, the said first and third members being axially movable relative to each other, and said splined connection comprising a pair of spaced radial teeth on one member thereof, and a radial tooth on the other member thereof received between said spaced teeth and engageable therewith, one tooth comprising longitudinally spaced separate tooth portions defining a recess permitting limited relative rotation between said first and third members upon disengagement of said clutch members, and another adjacent tooth having a portion to engage with at least one of said spaced tooth portions of the said one tooth and having a transversely projecting portion to enter said recess upon engagement of said adjacent teeth incident to said relative rotation, whereby to limit relative axial movement of said first and third members.

3. Power transmission mechanism comprising a first rotatable clutch member adapted to be engaged with a second rotatable clutch member to establish a drive therebetween and a third rotatable member in telescopic relation to said first member, said telescopic members being relatively movable axially, one of said telescopic members having a plurality of circumferentially spaced apart radial teeth and the other having spaced internal radial teeth received between adjacent teeth of the said one member, a side face of certain teeth of one toothed member having a recess, and certain teeth of the other toothed member being arranged and constructed to have portions thereof rotatably received into the said recesses of adjacent teeth when moved into substantially aligned engagement therewith, incident to disengagement of said first and second clutch members, the bottoms of said recesses substantially paralleling the engaging tooth faces and end faces of said recesses projecting transversely of the engaging teeth to provide stop limits for said axial movement to retain said first and second clutch members disengaged.

4. Power transmission mechanism comprising a rotatable clutch member movable axially to establish a drive with another clutch member, a plurality of radial teeth on said movable rotatable clutch member constantly meshed with radial teeth of another rotatable member, one tooth of one of said rotatable members having a recess permitting limited relative rotation between said rotatable members incident to disengagement of said clutch members and a meshing tooth of the other of said rotatable members having a portion to interengage in said recess to limit said axial movement of said movable clutch member relative to said other clutch member the extent of said permissible movement being less than that necessary to move said first clutch member between its engaged and disengaged position relative to said second clutch member.

5. Power transmission mechanism comprising a rotatable driving member, a rotatable driven member, a shaft supporting said driven member for axial movement relative to said driving member, a pressure member for adjusting said driven member relative to said driving member for establishing a drive therebetween, said pressure member being retractable to accommodate adjustment of said driven member for releasing said drive, a splineway on one of said driven member and shaft, said splineway having opposite walls, a radial tooth on the other of said driven member and shaft received between said opposite walls and engageable therewith, one of said walls including a recess permitting limited relative rotation between said driven member and shaft and said radial tooth having a portion adapted to be received in said recess upon engagement of said tooth with the wall having said recess incident to release of said drive, thereby to limit axial movement of said driven member and retain said driven member in spaced relation to said pressure member when the latter is in retracted position.

6. Power transmission mechanism comprising a rotatable driving member, a rotatable driven member, a shaft supporting said driven member for axial movement relative to said driving member, a pressure member for adjusting said driven member relative to said driving member for establishing a drive therebetween, said pressure member being retractable to accommodate adjustment of said driven member for releasing said drive, a pair of spaced radial teeth on one of said driven member and shaft, a radial tooth on the other of said driven member and shaft received between said spaced teeth and engageable therewith, one tooth having a recess permitting limited relative rotation between said driven member and shaft and an adjacent tooth having a portion adapted to be received in said recess upon engagement of said adjacent teeth thereby to limit axial movement of said driven member and retain said driven member in spaced relation to said pressure member when the latter is in retracted position.

7. Power transmission mechanism as defined in claim 6 wherein said recess includes stop means to positively limit axial movement of said driven member to retain said driven member in spaced relation to said driving member and pressure member when the latter is in retracted position.

8. Power transmission mechanism comprising a rotatable driving member, a rotatable driven member, a shaft supporting said driven member for axial movement relative to said driving member, a pressure member for adjusting said driven member relative to said driving member for establishing a drive therebetween, said pressure member being retractable to accommodate adjustment of said driven member for releasing said drive, a pair of spaced radial teeth on one of said driven member and shaft, a radial tooth on the other of said driven member and shaft received between said spaced teeth and engageable therewith, one tooth having a recess in a side face thereof between the ends of the tooth permitting limited relative rotation between said driven member and shaft upon release of said drive and an adjacent tooth having a portion adapted to be received in said recess upon engagement of said adjacent teeth when said recess and portion are aligned with each other, the length of said recess longitudinally of its tooth being greater than the length of said adjacent tooth portion but no greater than the length of said portion plus the amount of clutch departure.

9. Power transmission mechanism comprising a rotatable driving member, a rotatable driven member, a shaft in splined connection to said driven member and permitting relative axial movement between said driving and driven members, a pressure member for adjusting said driven member relative to said driving member for establishing a drive therebetween, said pressure member being retractable to accommodate adjustment of said driven member for releasing said drive to allow said shaft to coast, said splined connection comprising a plurality of spaced teeth on one of said driven member and shaft and splineways on the other of said driven member and shaft, certain walls of said splineways being recessed and portions of certain of said teeth being engageable in said recesses, said driven member and shaft being relatively rotatable whereby said tooth portions may enter said recesses upon retracting said pressure member to effect coast of said shaft and may leave said recesses upon movement of said pressure member to effect drive of said shaft.

10. Power transmission mechanism comprising a rotatable driving member, a rotatable driven member including a hub and a clutch disc having flexible connection with said hub to allow axial movement therebetween, a shaft in splined connection with said hub and permitting relative axial movement between said driving and driven members, a pressure member for adjusting said driven member relative to said driving member for establishing a drive therebetween, said pressure member being retractable to accommodate adjustment of said driven member for releasing said drive and allowing coast of said shaft, said splined connection comprising a plurality of spaced teeth on one of said hub and shaft received in splineways of the other of said hub and shaft, the opposite walls of certain splineways being recessed and the opposite portions of the teeth in said recessed splineways being receivable respectively in said opposite recesses, said hub and shaft being relatively rotatable whereby said tooth portions on one side of said teeth may enter recesses on one side of said splineways upon retracting said pressure member to permit coast of said shaft and may leave said recesses and have their opposite tooth portions enter the opposite recesses upon movement of said pressure member to effect drive of said shaft; the said recesses limiting axial movement of said driven member to inhibit drag between said pressure member and clutch disc when said pressure member is in its retracted position.

11. Power transmission mechanism comprising a first rotatable clutch member adapted to be engaged with a second rotatable clutch member to establish a drive therebetween, and a third rotatable member in splined connection with said first member, the said first and third members being axially movable relative to each other and said splined connection comprising a splineway on one member thereof having opposite walls, and a radial tooth on the other member thereof received in said splineway and engageable with said walls, one of said walls having a shallow recess forming part thereof, the end faces of which sharply intersect other portions of said one wall, and said radial tooth having a substantially sharp cornered portion adapted to be received in said recess upon relative rotation of said first and third members permitted by abutment between said cornered portion of said radial tooth and said recess whereby axial movement of said first and third members may be limited by said end faces of said recess.

12. Power transmission mechanism comprising a first rotatable clutch member adapted to be engaged with a second clutch member to establish a drive therebetween, and a third rotatable member in splined connection with said first member, the said first and third members being axially movable relative to each other and said splined connection comprising a splineway on one member thereof having opposite walls spaced to receive a radial tooth of the other member thereof, one of said walls having a recess permitting relative rotation between said first and third members, and the said recess being adapted to receive a portion of said radial tooth incident to said relative rotation when said first and second clutch members are disengaged and said recess and tooth portion providing abutments to limit axial movement of said first and third members whereby to retain said first and second clutch members disengaged.

13. Power transmission mechanism comprising a first rotatable clutch member adapted to be engaged with a second clutch member to establish a drive therebetween, and a third rotatable member in splined connection with said first member, the said first and third members being axially movable relative to each other and said splined connection comprising a splineway on one member thereof having opposite walls spaced to receive a radial tooth of the other member thereof, one of said walls having a recess permitting limited relative rotation between said first and third members, the said recess being adapted to receive a portion of said radial tooth incident to said relative rotation when said first and second clutch members are disengaged and said recess providing a sharp cornered shoulder and said tooth portion a sharp cornered abutment, to limit relative axial movement of said first and third members whereby to retain said first and second clutch members disengaged.

14. Power transmission mechanism comprising a first clutch member adapted to be engaged with a second rotatable clutch member to establish a drive therebetween and a third rotatable member in splined connection with said first member, the said first and third members being axially movable relative to each other and said splined connection comprising a pair of spaced radial teeth on one member thereof, and a radial tooth on the other member thereof projecting between said spaced teeth, one of said spaced teeth having a recess in a side face thereof between the ends of the tooth forming sharp angled shoulders at said ends and permitting limited relative rotation between said first and third members upon disengagement of said clutch members and said radial projecting tooth having a portion adapted to be received in said recess incident to said relative motion, the said portion having sharp cornered end edges providing with said recess shoulder abutments to limit relative axial movement of said first and third members to an amount less than the movement of said first clutch member between its engaged and disengaged positions.

15. Power transmission mechanism comprising a first rotatable clutch member adapted to be engaged with a second rotatable clutch member to establish a drive therebetween and a third rotatable member in telescopic relation with said first member and having a series of circumferentially spaced radial teeth in mesh with a series of internal radial teeth on said first member, the said first and third members being axially movable relative to each other, and certain of the teeth on one of said members having a shallow recess between their ends to receive a portion of adjacent interengaging teeth on the other member, the said telescoping members being relatively rotatable when the recesses of the teeth of one member are aligned transversely with the said portion of the teeth of the other member whereby said portions may be engaged in said recesses upon disengagement of said clutch members and said recesses having a sharp cornered shoulder and said tooth portions a sharp cornered abutment adjacent said shoulder whereby to limit relative axial movement of said first and third members.

16. Power transmission mechanism comprising a first clutch member adapted to be engaged with a second rotatable clutch member to establish a drive therebetween and a third rotatable member in splined connection with said first member, said splined connection comprising a pair of spaced radial teeth on one member thereof, a radial tooth on the other member thereof received between said spaced teeth and engageable with one or the other of the adjacent teeth in accordance with the driving relationship between said splined members, said spaced teeth each having an elongated shallow recess adjacent said engageable tooth, permitting limited relative rotation between said first and third members, and said engageable tooth having opposite portions, one of which is adapted to become aligned with and engaged in one of said recesses and the other in the other of said recesses in accordance with said driving relationship incident to disengagement of said first and second clutch members whereby to resist re-engagement of said clutch members, said recesses each having a sharp cornered shoulder at a common end thereof and said engageable tooth portions having substantially sharp cornered edges at the same end to provide abutment faces to resist said re-engagement.

OTTO E. FISHBURN.

REFERENCES CITED

The following references are of record in the file of this patent:

UNITED STATES PATENTS

| Number | Name | Date |
|---|---|---|
| 2,070,140 | Peterson et al. | Feb. 9, 1937 |
| 2,236,552 | Shurts et al. | Apr. 1, 1941 |

Certificate of Correction

Patent No. 2,441,140.

May 11, 1948.

OTTO E. FISHBURN

It is hereby certified that errors appear in the printed specification of the above numbered patent requiring correction as follows: Column 12, lines 70 and 71, strike out the words "abutment between said cornered portion of said radial tooth and" and insert the same after "by" in line 73; and that the said Letters Patent should be read with these corrections therein that the same may conform to the record of the case in the Patent Office.

Signed and sealed this 9th day of November, A. D. 1948.

[SEAL]

THOMAS F. MURPHY,
*Assistant Commissioner of Patents.*